June 7, 1927.  N. SALO  1,631,649
ANTIKICK AUTO CRANK
Filed July 30, 1926  2 Sheets-Sheet 2
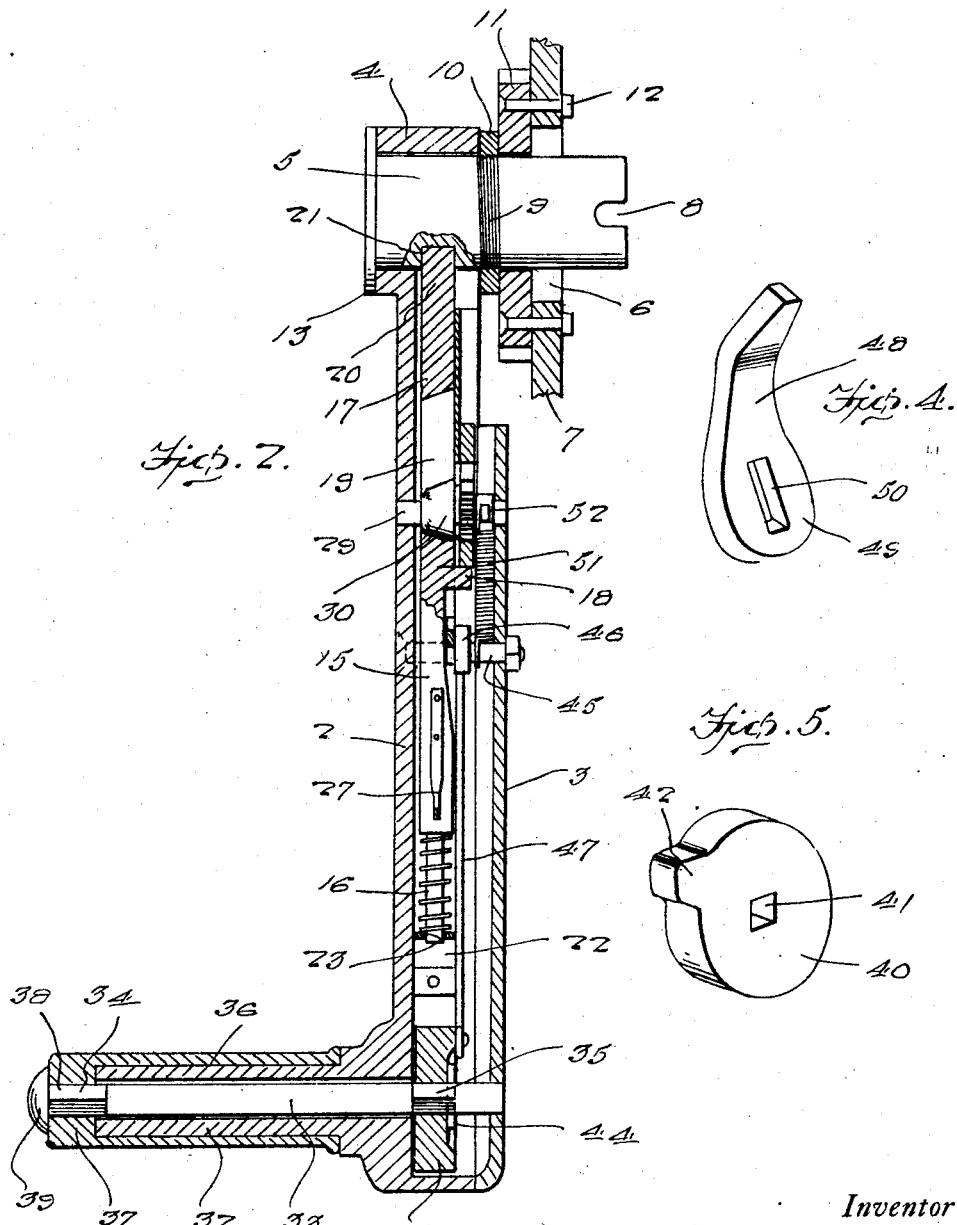
Inventor
Nels Salo
By Clarence A O'Brien
Attorney Patented June 7, 1927.

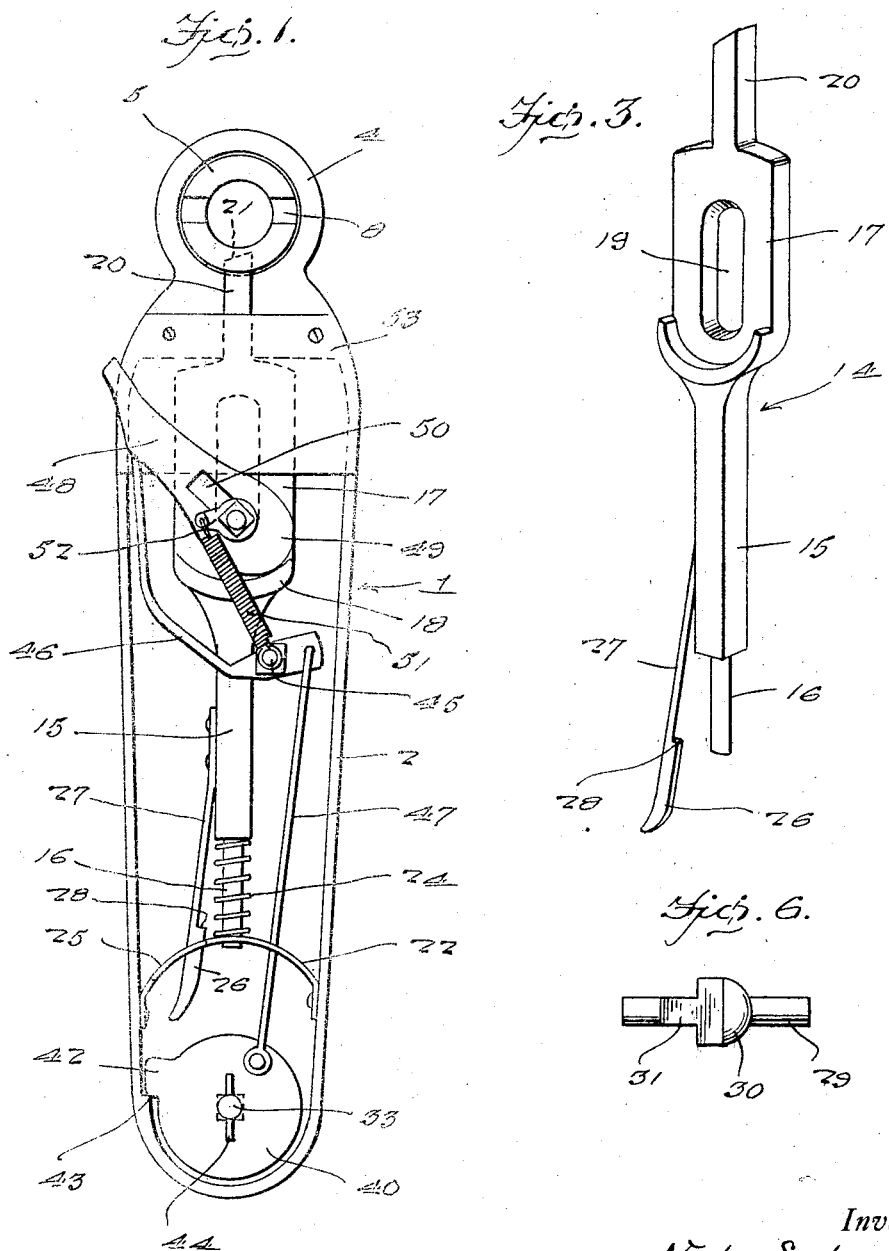

1,631,649

UNITED STATES PATENT OFFICE.

NELS SALO, OF WATTON, MICHIGAN.

ANTIKICK AUTO CRANK.

Application filed July 30, 1926. Serial No. 125,989.

The present invention relates to improvements in automobile cranks and has for its principal object to provide a crank which is of such construction as will prevent any serious injury being sustained by the person cranking an automobile should a back fire occur during the cranking operation.

One of the important objects of the present invention is to provide an automobile crank of the above mentioned character which includes a means for locking the crank in engagement with the crank shaft actuating member, additional means being provided for automatically releasing the aforementioned means for rendering the crank inoperative should a back fire occur during the cranking operation of the automobile.

A further object of the invention is to provide an anti-kick automobile crank which will at all times be positive and efficient in its operation, the same being further simple in construction, inexpensive, strong and durable, and further well adapted to the purpose for which it is designed.

Other objects and advantages of the invention will become apparent from the following description taken in connection with the accompanying drawings.

In the accompanying drawings forming a part of this application and in which like numerals indicate like parts throughout the several views:

Figure 1 is an inner side elevation of the auto crank embodying my invention, the cover plate being removed.

Figure 2 is a vertical sectional view through the crank and showing the manner in which the same is associated with the crank bar.

Figure 3 is a detail perspective view of the vertically slidable member forming a part of my improved crank.

Figure 4 is a detail perspective view of the pawl.

Figure 5 is a similar view of the cam wheel, and

Figure 6 is a side elevation of the pin member.

In the drawing wherein for the purpose of illustration is shown the preferred embodiment of my invention, the numeral 1 designates generally my improved anti-kick automobile crank, the same comprising the hollow body portion 2, the rear or inner side of which is open. A cover plate 3 is adapted to be secured to the open inner or rear side of the hollow body. A sleeve 4 is formed on the upper end portion of the body 2, and this sleeve is adapted to encircle the outer end of the crank bar 5 and is adapted for rotation therearound in the manner to be hereinafter more fully described.

The crank bar 5 extends through a suitable opening 6 provided therefor in the front portion of an automobile casing 7 and the inner end of this crank bar is notched as at 8 for engagement with the laterally projecting pin carried by the crank shaft (not shown) in the manner well known in the art. For the purpose of preventing the slidable movement of the crank bar 5, the intermediate portion thereof is threaded as at 9, and an internally threaded ring 10 is on the threaded portion 9 of the crank bar and the ring is interposed between the sleeve 4 and the outer face of a stationary ratchet wheel 11 which is secured on the outer face of the plate 7 by any appropriate fastening means such as is shown at 12. The purpose of this ratchet wheel 11 will also be hereinafter more fully described. The outer end of the crank bar 5 is provided with a flange 13 which provides a means for preventing the lateral displacement of the sleeve 4 from the outer end of the crank bar as is clearly shown in Figure 2 of the drawings.

The crank further includes a slidable plunger member designated generally by the numeral 14 and the latter comprises a shank portion 15 which is substantially rectangular in cross section, the lower end thereof being reduced and rounded to provide a depending portion 16. A plate like head 17 is formed on the upper end of the shank 15 and at the juncture of the head with the shank, there is provided the laterally projecting semi-circular shaped portion 18, as is clearly shown in Figure 3. A longitudinally extending slot 19 is formed in the intermediate portion of the plate like head 17, and extending upwardly from the upper end of the head is a crank bar engaging finger 20, the upper end thereof being beveled or cut off at an angle and the crank bar is provided with a suitable notch 21 for the reception of the upper end of this finger whereby the crank bar will be held in locked engagement with the crank to facilitate the cranking of the automobile engine by hand.

A curved strip of metal 22 extends transversely across the lower portion of the hollow body 2, and the depending portion 16 is adapted for slidable movement through a central opening 23 provided therefor in the cross strip 22. An expansible coil spring 24 encircles the depending portion 16, and is disposed between the lower end of the shank 15 and the curved cross strip 22 for normally urging the plunger member 14 upwardly so that the finger 20 will be maintained in engagement with the notch 21 provided therefor in the crank bar 5.

The metallic cross strip 22 is provided further with a slot 25 through which extends the nose 26 formed on the lower end of the rod 27, the upper end of which is secured to the shank 15. The shoulder 28 forming a part of the nose 26 is adapted for engagement with one end of the slot for retaining the slidable plunger in its retracted position.

Also forming an important part of my improved crank is the pin member 29, the same having its ends disposed in suitable openings provided therefor in the front side of the hollow body 2 and in the cover plate 3 adjacent the upper end portion thereof. An enlarged rounded portion 30 is formed on the intermediate portion of this pin and the rounded portion is adapted for disposition within the longitudinally extending slot 19 formed in the plate like head 17 of the slidable plunger 14. The pin 29 is further provided with the square shaped portion 31 and the purpose thereof will be presently apparent.

A tubular extension 32 is formed on the lower end portion of the body and extends laterally therefrom, as is clearly shown in Figure 2. A shaft 33 extends longitudinally through the tubular extension 32 and the inner end of this shaft is journaled in a suitable opening provided therefor in the lower end portion of the cover plate 3. The outer end of the shaft 33 is squared as illustrated at 34 and the purpose thereof will also be presently described. The shaft 33 is further provided with the squared portion 35 and this squared portion is disposed within the body 2.

A sleeve 36 is free for rotation on the tubular extension 32 and the outer end of this sleeve is provided with the solid portion 37 and this solid portion has formed centrally therein the square shaped opening 38 for receiving the squared end 34 of the shaft 33 so that the sleeve 36 will rotate the shaft. A head 39 is provided on the outer end of the shaft and engages the outermost or solid end 37 of the sleeve 36 in the manner clearly shown in Figure 2.

A cam wheel 40 is provided with square central opening 41 for cooperation with the squared portion 35 of the shaft 33 so that the cam will rotate simultaneously with the shaft 33. The cam 42 which is formed on the peripheral edge of the wheel 40 normally rests on the shoulder 43 formed on the inner side of the lower portion of the hollow body 2. A key 44 extends transversely through a suitable opening provided therefor in the inner end portion of the shaft 33, and adjacent the inner or rear face of the wheel 40 for preventing the lateral sliding movement of the cam wheel from disengagement with the square shaped portion 35.

A bolt 45 extends transversely through the intermediate portion of the body 2 and the cover 3 and is disposed adjacent one side of the shank 15 of the slidable plunger 14. A lever 46 is pivotally mounted adjacent one end on this bolt 45, and the longer end portion of the lever is disposed laterally and thence upwardly in the manner clearly shown in Figure 1. A rod 47 affords a connection between the pivoted end of the lever 46 and the cam wheel 40.

The upper free end of the longer arm of the lever 46 is adapted for cooperation with the pawl 48, the lower portion of which is formed with the enlarged rounded portion 49 and a longitudinal slot 50 is provided in the enlarged rounded portion 49 in the manner clearly shown in Figure 4. The upper end of this pawl 48 is offset so that the same will cooperate with the ratchet wheel 11 in the manner to be hereinafter more fully described.

The slot 50 cooperates with the squared portion 31 of the transversely extending pin 29 so that when the slidable plunger 14 is actuated, the pawl 48 will be adapted for simultaneous operation therewith. Furthermore the rounded portion of the enlargement 49 is disposed directly above the curved shoulder 18 as is clearly shown in Figure 1.

For the purpose of normally holding the pivoted pawl 48 out of engagement with the ratchet wheel 11 there is provided the coil spring 51, the same being attached at its lower end to the bolt 45, and at its upper end to the pin 29 through the medium of the connection 52.

A division plate 53 is secured to the inner or rear face of the upper portion of the hollow body 2 and provides a means for spacing the pivoted pawl 48 from the upper portion of the plate like head 17 which forms a part of the slidable plunger 14.

The operation of my improved crank may be briefly stated as follows. In cranking an automobile engine, the sleeve 36 is grasped and turned forwardly, at the same time causing the shaft 33 to rotate and also effecting the operation of the cam wheel 40 so that the free end of the lever 46 will cause the pawl 48 to be brought into engagement with the ratchet wheel 11. As the coil spring 24 normally urges the plunger member 14 upwardly, the finger 20 will be held in locked engagement with the notch 21 formed in the crank bar 5 and therefore permitted to actuate the crank bar will be permitted to actuate the crank shaft in the usual manner for cranking the automobile engine.

When the engine back fires, the crank bar 5 which is engaged with the crank shaft and pins through the medium of the notches 8 in the manner well known in the art, will move backwardly so that the pawl 48 will engage the ratchet wheel 11 and in turn effect the downward sliding movement of the slidable plunger 14 through the medium of the rounded portion of the enlargement 48 coacting with the curved shoulder 18, thus releasing the finger 20 from engagement with the notch 21 and at the same time causing the nose 26 to pass downwardly through the slot 25, and when the shoulder 28 engages one end of the slot, the plunger 14 will be held in a retracted position, thus permitting the crank bar 5 to rotate freely without effecting the operation of the crank handle.

The operator upon continuing the cranking motion after the back fire has occurred will result in the cam 42 engaging the nose 26 to release the shoulder 28 so that the coil spring 24 will again move the plunger to its raised position.

Whenever the forward pressure is released from the sleeve 36, the coil spring 51 will disengage the pawl 48 for engagement with the ratchet wheel 11.

It will thus be seen from the foregoing description, that I have provided an automobile crank which will prevent any possibility of the operator sustaining any injury such as frequently results when back fire occurs during the cranking operation of an automobile engine. The simplicity in which my device is constructed enables the parts to be readily and easily assembled, and furthermore the crank will at all times be positive and efficient in carrying out the purposes for which it is designed.

While I have shown the prefered embodiment of my invention, it is to be under- stood that minor changes may be made in the invention without departing from the spirit of the invention and the scope of the appended claims.

Having thus described the invention, what I claim as new and desire to secure by Letters Patent is:—

1. An anti-kick automobile crank comprising in combination, a rotatable crank bar, a hollow body member, a sleeve formed on the upper end of said hollow body member and rotatably mounted on the crank bar, a slidable plunger mounted in the upper portion of the hollow body member, said crank bar being provided with a notch for the reception of the upper end of said plunger member whereby the hollow body member will be locked to the crank bar for simultaneous actuation, means for normally urging the slidable plunger member upwardly into cooperative relation with said crank bar, a pawl and ratchet mechanism for releasing the plunger from said notch when a back fire occurs, and means for retaining the slidable plunger in a retracted position.

2. An anti-kick automatic crank comprising in combination, a rotatable crank bar, a hollow body member, a sleeve formed on the upper end of the hollow body member and rotatably mounted on the crank bar, a slidable plunger mounted in the upper portion of the hollow body member, said crank bar being provided with a notch for the reception of the upper end of said plunger member whereby the hollow body member will be locked to the crank bar for simultaneous actuation, means for normally urging the slidable plunger member upwardly into cooperative relation with said crank bar, a pawl and ratchet mechanism for releasing the plunger from said notch when a back fire occurs, means for retaining the slidable plunger in a retracted position, and additional means for actuating the last mentioned means to effect the return of the slidable plunger to its normal position.

In testimony whereof I affix my signature.

NELS SALO.